(12) United States Patent
Xiao et al.

(10) Patent No.: US 8,963,000 B2
(45) Date of Patent: Feb. 24, 2015

(54) JUNCTION BOX HAVING IMPROVED CLIPS

(71) Applicant: Hon Hai Precision Industry Co., Ltd., New Taipei (TW)

(72) Inventors: Xue-Yuan Xiao, Kunshan (CN); Hong-Qiang Han, Kunshan (CN); Zi-Qiang Zhu, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 164 days.

(21) Appl. No.: 13/648,445

(22) Filed: Oct. 10, 2012

(65) Prior Publication Data

US 2013/0087360 A1  Apr. 11, 2013

(30) Foreign Application Priority Data

Oct. 11, 2011 (CN) .......................... 2011 2 0384204
Oct. 11, 2011 (CN) .......................... 2011 2 0384207

(51) Int. Cl.
*H01R 13/46* (2006.01)
*H02G 3/16* (2006.01)

(52) U.S. Cl.
CPC ...................................... *H02G 3/16* (2013.01)
USPC ............................. 174/60; 174/520; 174/548

(58) Field of Classification Search
CPC ......... H02G 3/08; H02G 15/10; H02G 15/02; H02G 3/0418; H02H 7/10; H02H 7/125; H05G 1/12; H01L 33/62; H01L 33/52; H05B 33/08; H01R 4/28; H01R 12/00; H01R 12/50; H01R 31/06; H05K 5/003; H05K 5/0004; H05K 5/0047; H05K 5/0226
See application file for complete search history.

(56) References Cited

U.S. PATENT DOCUMENTS 7,291,036 B1 * 11/2007 Daily et al. .................... 439/487
2010/0218802 A1 * 9/2010 Quiter ............................ 136/244
2012/0000689 A1 * 1/2012 Shu et al. ......................... 174/59
2012/0067613 A1 * 3/2012 Yu et al. .......................... 174/59

FOREIGN PATENT DOCUMENTS

CN 201038672 3/2008

* cited by examiner

*Primary Examiner* — Timothy Thompson
*Assistant Examiner* — Michael F McAllister
(74) *Attorney, Agent, or Firm* — Wei Te Chung; Ming Chieh Chang

(57) ABSTRACT

A junction box (100) includes a cable connecting box, a cover (2) covering the cable connecting box, and a cable (4) connecting with the cable connecting box. The cable (4) connecting box has an insulative block (5), a number of contacting foils (6), and a number of diodes (31) connecting adjacent contacting foils (6). The junction box (100) further includes a plurality of clips (9) mounted in the insulative block (5) and electrically connecting with the contacting foils (6). The clip (9) includes a clamp spring (91) and an elastic plate (92) received in the clamp spring (91) to resist the clamping spring (91). As a result, the clamp spring (91) will not resist the cable connecting box so as to improve an using life of the junction box (100).

18 Claims, 8 Drawing Sheets

JUNCTION BOX HAVING IMPROVED CLIPS

BACKGROUND OF THE INVENTION

1. Field of the invention

The present invention generally relates to a junction box and more particularly to a junction box with a clip.

2. Description of Related Art

Chinese patent No. CN201038672U discloses a junction box including an insulative box, a cover covering an upper side of the insulative box, a plurality of contacting foils retained in the insulative box, a plurality of diodes connecting with the adjacent contacting foils and clips clamping the contacting foils and a plurality of contacting plates of a photovoltaic module. The clip is mounted in the contacting foils along an upper to down direction and includes a clamp spring and an elastic plate. The elastic plate is located in the front of the clamp spring. One end of the elastic plate resists the insulative box forwardly and another end resists the clamp spring backwardly. But since the elastic plate is located in the front of the clamp spring, a length of the insulative box is increased. The force of the elastic plate resisting the inslusaive box also may make the insulative box be broken easily.

Other objects, advantages and novel features of the present invention will become more apparent from the following detailed description of the present embodiment when taken in conjunction with the accompanying drawings.

SUMMARY OF THE INVENTION

The present invention provides a junction box comprises a cable connecting box, a cover covering an upper side of the cable connecting box, a clip mounted into the cable connecting box and a cable connecting with the cable connecting box. The cable connecting box has an insulative block, a contacting foils retained in the insulative block and a plurality of diodes connecting with the adjacent contacting foils. The clip contacts with the contacting foils electrically and has a clamp spring clamping a plurality of contacting plates of the photovoltaic module.

Other objects, advantages and novel features of the present invention will become more apparent from the following detailed description of the present embodiment when taken in conjunction with the accompanying drawings.

DETAILED DESCRIPTION OF THE INVENTION

Figure 1:
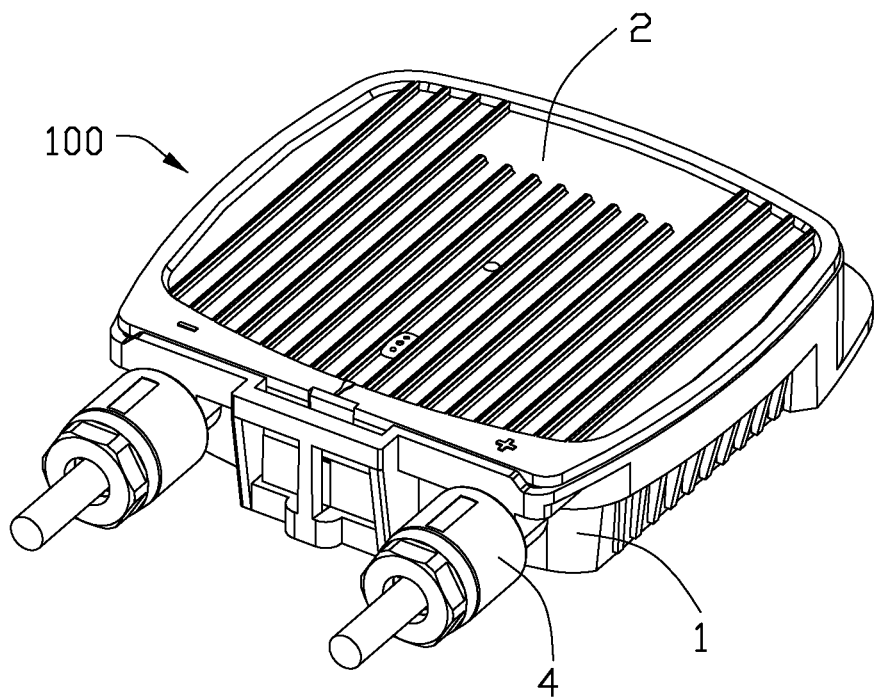
FIG. 1 is an assembled perspective view of a junction box according to a preferred embodiment of the present invention.
Figure 2:
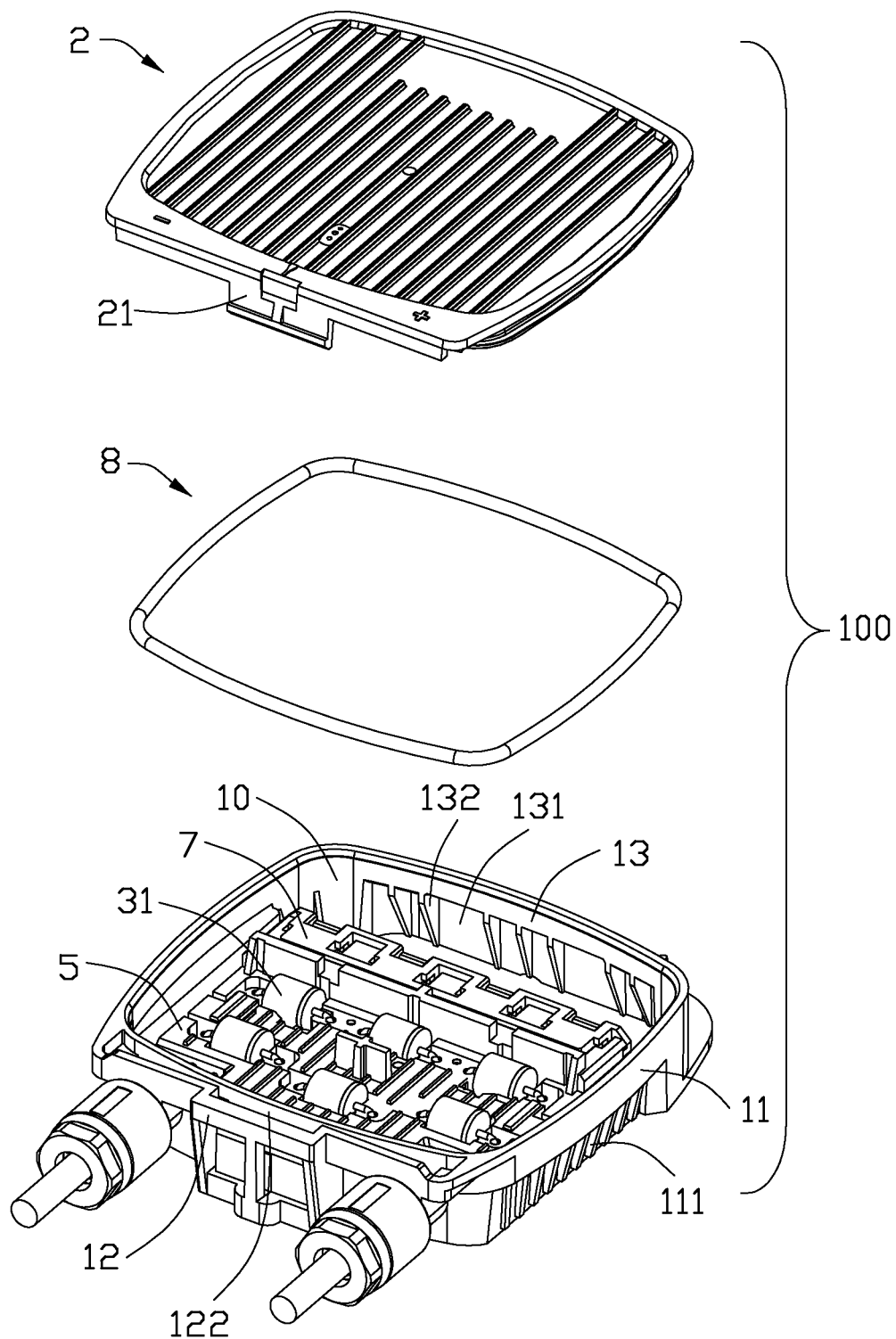
FIG. 2 is a perspective view of the junction box, wherein a cover is separated.
Figure 3:
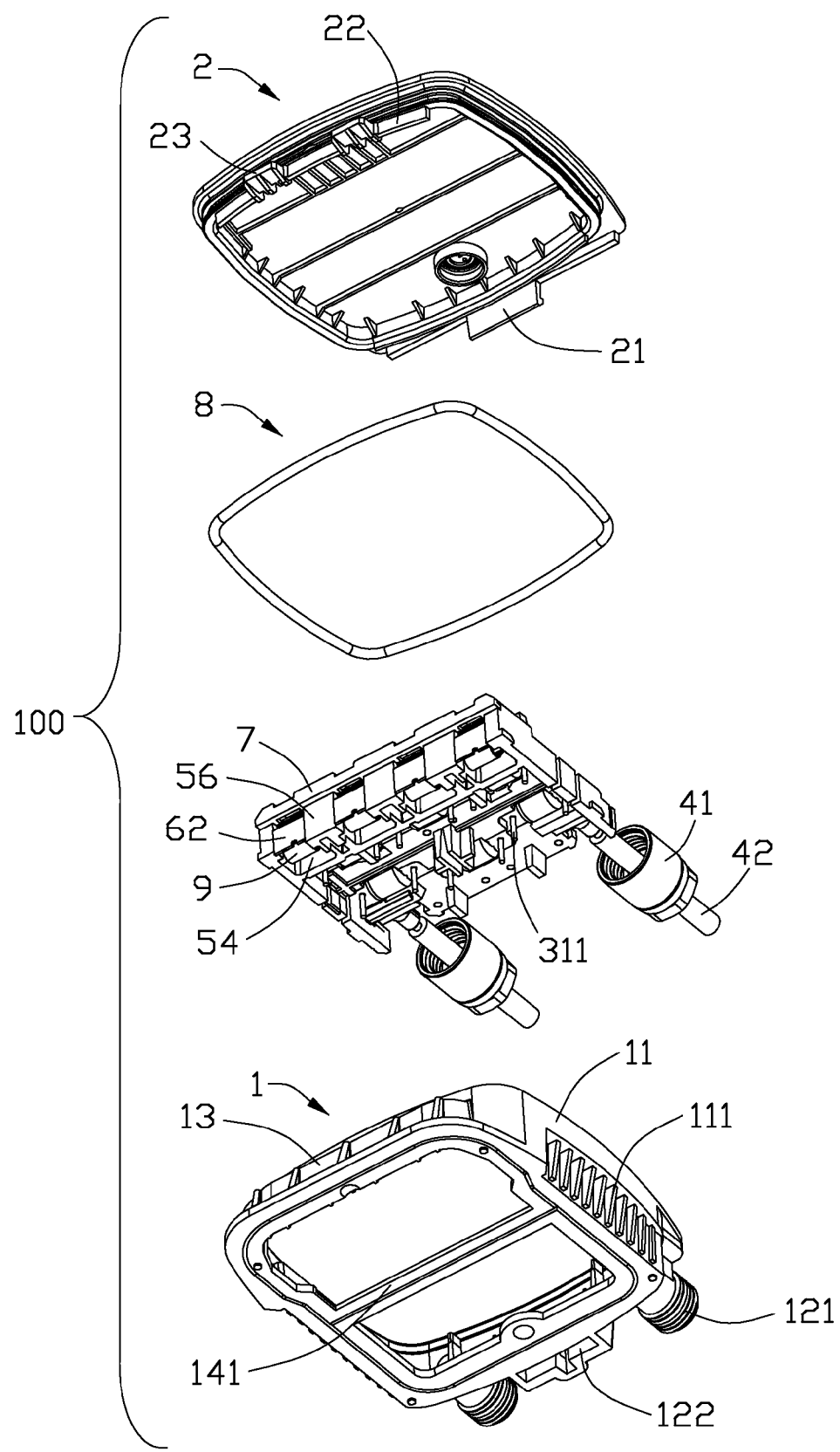
FIG. 3 is a partially exploded perspective view of the junction box shown in FIG. 1.

Reference will now be made to the drawing figures to describe the preferred embodiment of the present invention in detail.

Referring to FIGS. 1-4, a junction box 100 used for electrically connecting a photovoltaic (PV) module (not shown) and transmitting electrical current according to the present invention is disclosed. The junction box 100 includes a cable connecting box, a cover 2 covering an upper side of the cable connecting box and a cable 4 connecting with the cable connecting box. The cable connecting box includes an insulative box 1 and a wire connecting module 3 attached to the insulative box 1.

Figure 4:
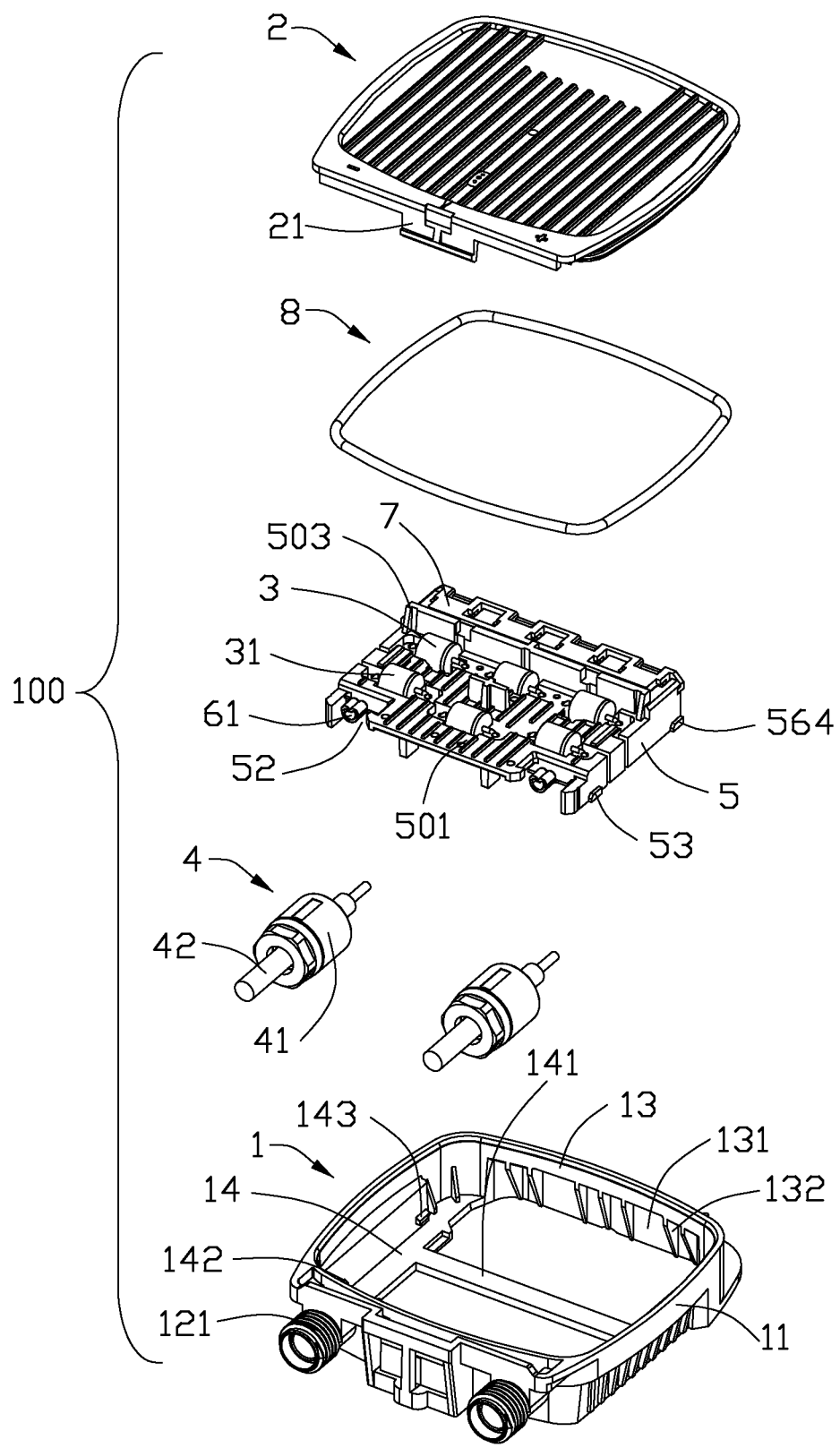
FIG. 4 is another partially exploded perspective view of the junction box.
Figure 5:
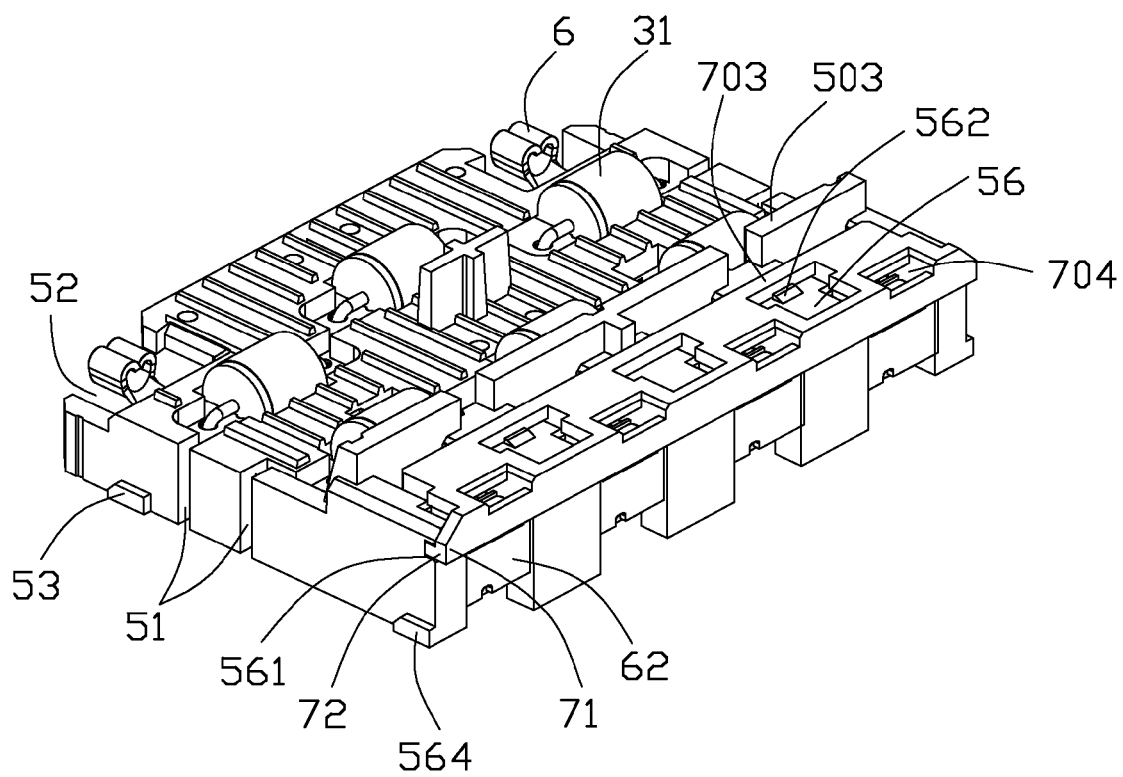
FIG. 5 is a perspective view of a wire connecting module of the junction box.
Figure 6:
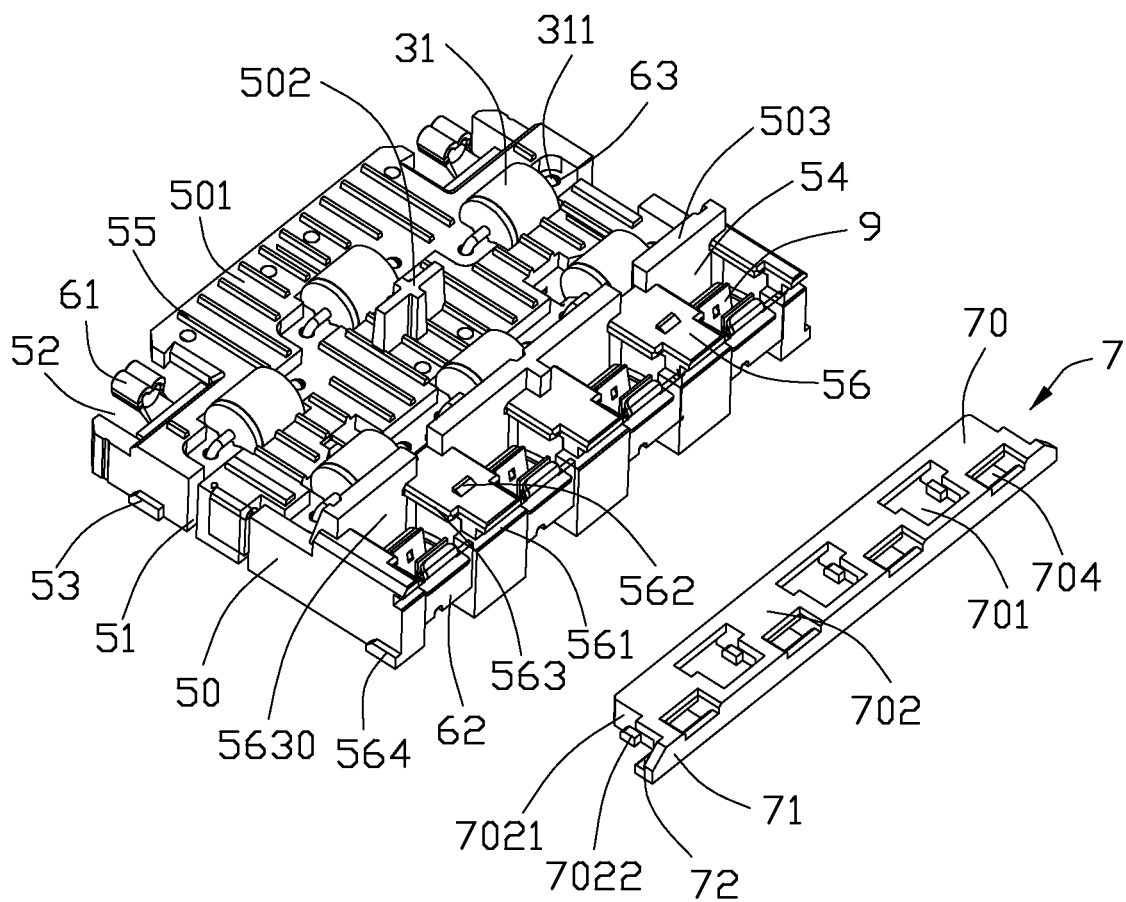
FIG. 6 is a partially assembled view of view connecting module shown in FIG. 5.
Figure 7:
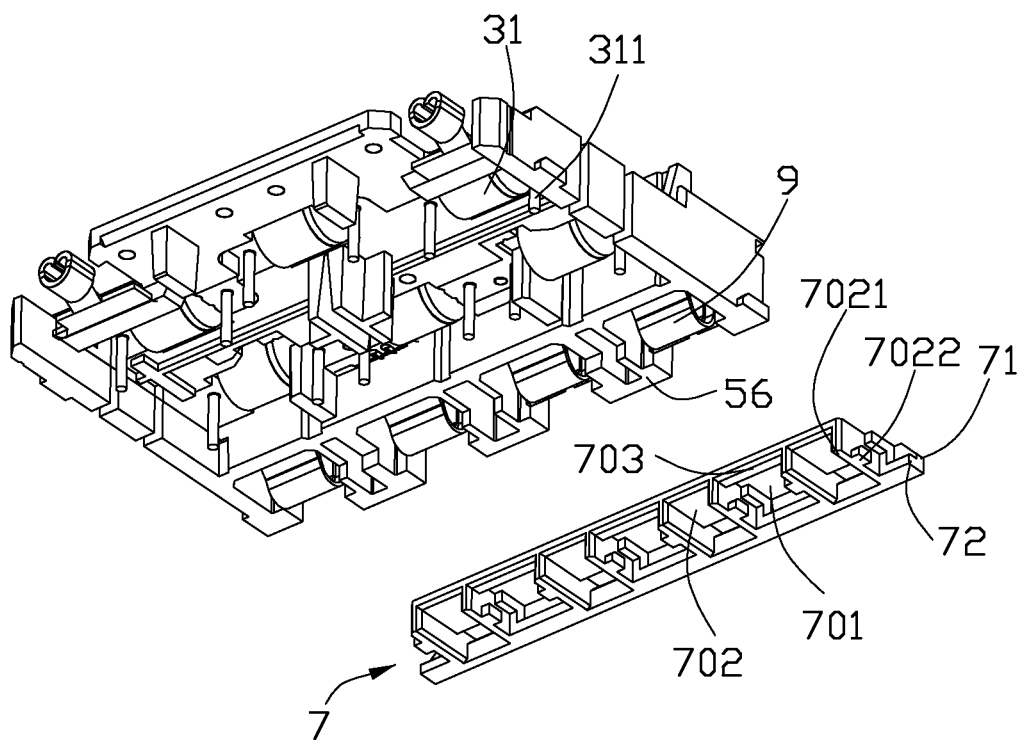
FIG. 7 is similar with FIG. 6, but taken from another view.
Figure 8:
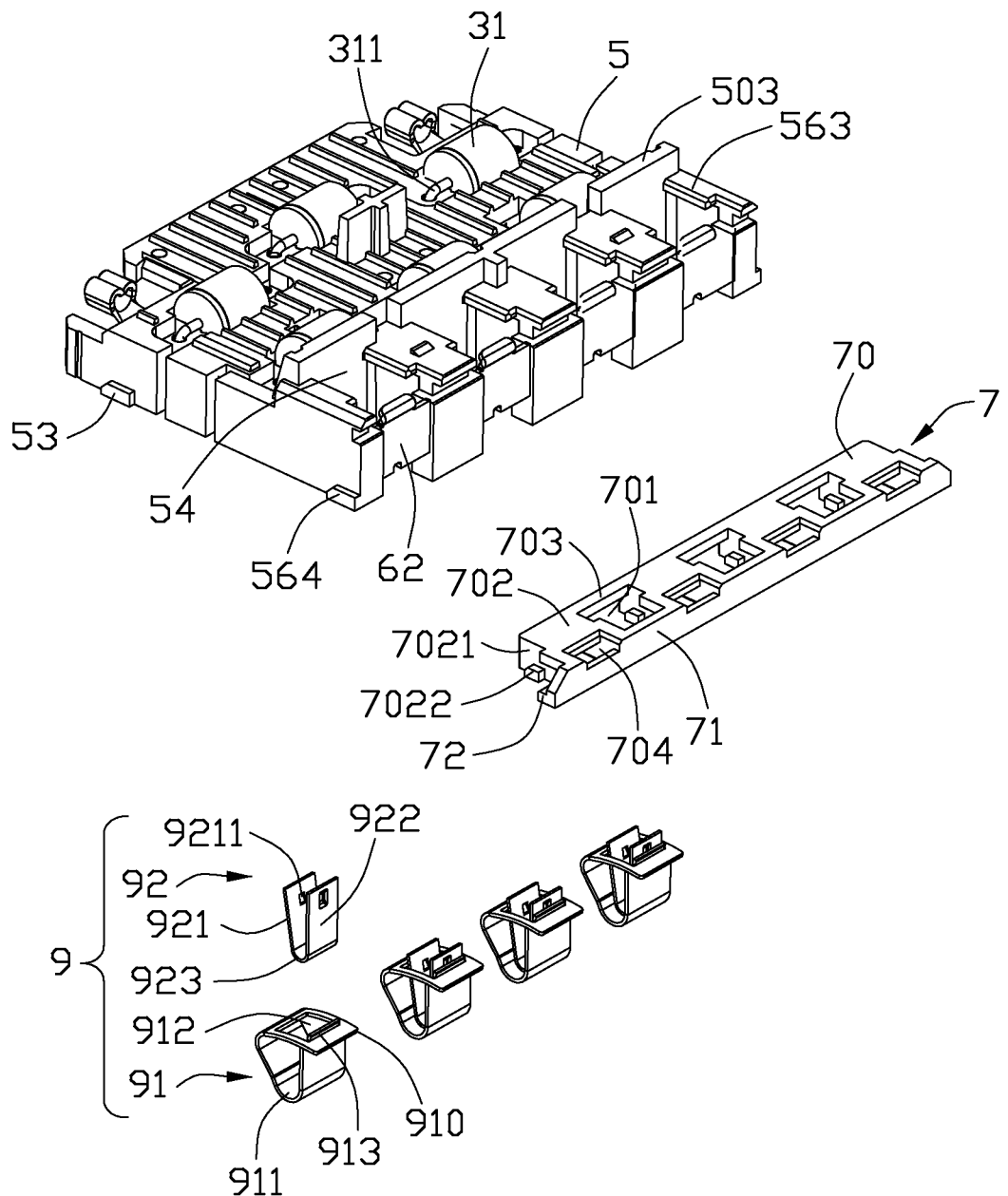
FIG. 8 is a further exploded view of the view connecting module shown in FIG. 6.

Referring to FIGS. 4-6, the wire connecting module 3 includes a plastic insulative block 5 presented as a rectangular shape, a shield cover 7 assembled in a rear of the insulative block 5, a plurality of contacting foils 6 integrally molded in the insulative block 5 and a plurality of diodes 31 connecting with the adjacent contacting foils 6.

Please referring to FIGS. 4-8, the insulative block 5 has a body portion 50 approximately shaped as a rectangular plate, a plurality of hollows 51 extending through the body portion 50 along an upper to lower direction. The body portion 50 has a top face 501 facing the cover 2 and a plurality of ribs 55 protruding upwardly from the top face 501.

In present invention, the insulative block 5 has two such hollows 51 arranged along a front-to-back direction, so the insulative block 5 is divided into three portions along the front-to-back direction by the hollows 51 which extend along a transverse direction vertical to the front-to-back direction of the body portion 50. The first portion of the body portion 50 is formed with a pair of first escaping portions 52 at two ends of a front end thereof and two first retaining tail 53 extending outwardly from two side walls thereof The first escaping portions 52 extend through the body portion 50 along the upper to lower direction.

The second portion of the body portion 50 includes a supporting portion 502 extending upwardly from the top surface 501 to support the cover 2. The third portion of the body portion 50 includes a plurality of fences 503 extending upwardly and near one side of the second portion, and a plurality of separating wall 56 extending backwardly from the fences 503. Each two adjacent separating wall 56 has a second escaping portion 54 therebetween. In this embodiment, the junction box 100 has five separating wall 56 along a left to right direction and four second escaping portions 54. The separating wall 56 is approximately shaped as a rectangular plate and has a retaining slot 561 depressed forwardly from a rear face thereof, a positioning block 562 extending upwardly from a top face thereof and two positioning wall 563 extending outwardly from two sides of the top face thereof Two of the separating walls 56 located in outer end each have only one positioning wall 563 extending inwardly thereof and two second retaining tails 564 extending outwardly from two outer face thereof Each two adjacent positioning walls 563 define a receiving space 5630 therebetween.

The shield cover 7 is mounted into the second portion of the insulative block 5 for covering the second escaping portion 54. The shield cover 7 is approximately shaped as a rectangular plate and has a flat portion 70 having a plurality of passageways 701 passing therethrough. The passageways 701 separate the shield cover 7 to form a plurality of positioning blocks 702 and a plurality of connecting wall 703 connecting with the two adjacent positioning blocks 702. In this embodiment, the shield cover 7 has three passageways 701 and four positioning boards 702. The shield cover 7 has an extending portion 71 extending downwardly from a rear side thereof and a retaining tail 72 extending forwardly from the extending portion 71. Each positioning block 702 has two attaching walls 7021 extending downwardly and vertically from two side thereof, two retaining convex 7022 extending outwardly from a middle of the attaching wall 7021, a plurality of transversal slots 704 passing therethrough from a top face thereof The transversal slots 704 are located behind the positioning boards 702. When the shield cover 7 is mounted into a rear of the third portion of the insulative block 5. The flat portion 70 presses the top of the separating wall 56, the positioning board 702 is located in the top of the second escaping portion 54, the connecting wall 703 and the passageway 701 are located in the top of the separating wall 56. Then, the shield cover 7 is moved forwardly and horizontally to make the attaching wall 7021 be received in the receiving space 5630, the retaining convex 7022 is located in a bottom of the positioning wall 563 and abuts against the positioning wall 563 upwardly, the retaining tail 72 is received in the retaining slot 561 of the separating wall 56 until the connecting wall 703 of the shield cover 7 extending forwardly beyond the positioning block 562 of the separating wall 56. The connecting wall 703 abuts against the positioning block 562 backwardly to prevent the shield cover 7 from moving backwardly, the retaining tail 72 is received in the retaining slot 561 of the separating wall 56 to prevent the shield shell 7 from moving upwardly, the transversal slot 704 is communicated with a rear of the second escaping portion 54. A top face of the shield cover 7 is lower than a top face of the fence 503.

The contacting foils 6 have a plurality of connecting portions 61 connecting with the cable 4 and received in the first escaping portions 52, a plurality of base portions insert-molded with the body portions 50 and extending backwardly along a mating direction of the cable 4, and a plurality of contacting portions 62 extending backwardly from the base portion and connecting with the photovoltaic module. The contacting portion 62 is located below the transversal slot 704 of the shield cover 7. The base portion of the contacting foils 6 have a plurality of through soldering holes 63 exposed in the hollow 51.

The junction box 100 further has a plurality of clips 9 for clamping the contacting portions 62 of the contacting foils 6 and a plurality of contacting plates (not shown) of the photovoltaic module. The clips 9 each define a clamp spring 91 and an elastic plate 92 received in the clamp spring 91. The clamp spring 91 defines a first part 910 and a second part 911 extending downwardly firstly and then upwardly from the first part 910. The first part 910 includes a through hole 912 and a free end extending horizontally. The second part 911 is disposed as a V-shaped and located below the first part 910 and has a inserting plate 913 which is narrower than the through hole 912. The inserting plate 913 passes through the through hole 912 and extend beyond the through hole 912. The inserting plate 913 can move within the through hole 912 along the front to rear direction.

The elastic plate 92 is disposed as an U-shaped and defines a first elastic arm 921, a second elastic arm 922 and a connecting arm 923 connecting two bottoms of the first and second elastic arms 921, 922. The first elastic arm 921 has a resisting block 9211 extending outwardly of a top thereof. The elastic plate 92 is received in a space formed by the second part 911 of the clamp spring 91. The first elastic arm 921 and the second elastic arm 922 all pass through the through hole 912 upwardly. The first elastic arm 921 abuts against an inner wall of the through hole 912 and the second elastic arm 922 abuts against the inserting plate 913. The resisting block 9211 is located below the through hole 912 and abuts against the first part 910 of the clamp spring 91 upwardly. The elastic plate 92 can improve the clamping force between the inserting plate 913 and the inner wall of the through hole 912. The clip 9 is received in the second escaping portion 54 of the insulative block 5. The contacting portion 62 is clamped between the inserting plate 913 and an inner wall of the through hole 912. The contacting plate of the photovoltaic module passes through the transversal slot 704 of the shield cover 7 and inserts into an area between the inserting plate 913 and the inner wall of the through hole 912 and be clamped by the inserting plate 913 and the inner wall of the through hole 912 to electrically connect the junction box 100 with the photovoltaic module.

The diode 3 has two tails 311 extending downwardly and vertically from two sides thereof. The tails 311 pass through the soldering holes 63 of the contacting foils 6 to solder with the base portion.

Referring to FIGS. 1-4, the insulative box 1 presents as a rectangular box, including two side walls 11, a front wall 12 and a rear wall 13 connecting the two side walls 11, a receiving cavity 10 surrounding by the side walls 11, the front wall 12 and the rear wall 13. The insulative box 1 further comprises a bottom wall 14 located under the receiving cavity 10. The front wall 12 defines two side by side mounting holes 121 with exterior thread, from which the cables 4 extend through to connect with the connecting portions 61 and a locking slot 122 located between the two mounting holes 121. The two side walls 11 have a plurality of outside ribs 111 extending along the upper to lower direction on an outside of the side walls 11 to enlarge an area for heat dissipation. The bottom wall 14 has two windows (not labeled) and a bridge 141 extending along the transverse direction between the windows. The side wall 11 has a pair of first pressing portions 142 and a pair of second pressing portions 143 extending inwardly thereof along a front to back direction. The first and second retaining tails 53, 564 latch with the first and second pressing portions 142, 143 along the upper to lower direction to prevent the insulative box 1 from moving upwardly. The rear wall 13 of the insulative box 1 has a locking hole 131 depressed backwardly from an inner surface thereof and a plurality of inside ribs 132 extending along the upper to lower direction on an inner surface thereof A wire mating portion (not labeled) is formed between the bridge 141 and the rear wall 13 for the contacting plates of the photovoltaic module inserting into.

The cover 2 comprises a locking barb 21 locking with the locking slot 122 of the front wall 12 of the insulative box 1. A preventing blade 22 extends downwardly from a back end of the cover 2. The preventing blade 22 has a plurality of protrusions 23 extending backwardly to lock with the locking holes 131 of the rear wall 13. An o-ring 8 seals the insulative box 1 when the cover 2 covers the insulative box 1, to prevent water flowing into an inner side of the junction box 100. The o-ring 8 is made of silicone or plastics materials and is formed in a rectangular circuit configuration.

The two cables 4 include two nuts 41 with interior thread and two wires 42 extending through the nuts 41 along a front-to-back direction. The interior threads of the nuts 41 match to the exterior threads of the mounting holes 121. The wires 42 insert into the insulative box 1 through the mounting holes 121 and electrically connect with the connecting portions 61 of the contacting foils 6 through the mounting holes 121, to finally position the cables 4 to the insulative box 1.

The junction box 100 includes an elastic plate 92 mounted in the clamp spring 91, so the elastic plate will not resist the insulative box 1 and that may improve the using life of the junction box 100.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A junction box comprising:
   a cable connecting box having an insulative block, a contacting foils retained in the insulative block and a plurality of diodes connecting with the adjacent contacting foils;
   a cover covering an upper side of the cable connecting box;
   a clip mounted into the cable connecting box and electrically contacting with the contacting foils, the clip comprising a clamp spring for clamping a contacting plate of the photovoltaic module and an elastic plate resisting the clamp spring toward the contacting plate; and
   a cable connecting with the cable connecting box.

2. The junction box as claimed in claim 1, wherein the elastic plate is separated from the clamp spring, the elastic plate is substantially received within the clamp spring.

3. The junction box as claimed in claim 1, wherein the clamp spring has a horizontal first part, the first part has a through hole and the elastic plate pass through the through hole downwardly and set within the clamp spring, the clamp spring also has a second part having an inserting plate which is narrower than a width of through hole, the inserting plate passes through the though hole upwardly and resists the first part.

4. The junction box as claimed in claim 3, wherein the elastic plate has a first elastic arm, a second elastic arm and a connecting arm connecting two bottoms of the first and second elastic arms, the first and second elastic arms pass through the through hole upwardly, the first elastic arm resists an inner edge of the through hole and the second elastic arm resists the inserting plate.

5. The junction box as claimed in claim 3, wherein the second part of the clamp spring extends from the first part downwardly firstly and then upwardly, the second part is disposed as a V-shaped and located below the first part, the inserting plate can move within the through hole along a front-to-back direction.

6. The junction box as claimed in claim 4, wherein the first elastic arm has a resisting block extending outwardly from a top thereof, the resisting block is located below the through hole and resists the first part of the clamp spring upwardly to limit the elastic plate moving upwardly.

7. The junction box as claimed in claim 3, wherein the insulative block has a plurality of separating walls extending backwardly therefrom and a plurality of second escaping portions formed between adjacent separating walls, the clip is received in the second escaping portion.

8. The junction box as claimed in claim 7, wherein the contacting foils has a contacting portion extending backwardly into the second escaping portion, the contacting portion passes through the through hole and is clamped between the inserting plate and the inner wall of the through hole.

9. The junction box as claimed in claim 1, further comprises a shield cover mounted in the insulative block to prevent the clip from moving from the insulative block.

10. The junction box as claimed in claim 9, wherein the shield cover is mounted into a rear part of the insulative block along a rear-to-front direction.

11. A junction box comprising:
    a cable connecting box having an insulative block, a plurality of contacting foils retained in the insulative block and a plurality of diodes connecting with adjacent contacting foils;
    a cover covering an upper side of the cable connecting box;
    a clip mounted in the insulative block and contacting with the contacting foils electrically, wherein the insulative block has a plurality of separating walls extending backwardly therefrom and a plurality of second escaping portions formed between adjacent separating walls, the clip is received in the second escaping portion;
    a shield cover mounted in the insulative block to prevent the clip from removing from the insulative block, the shield cover be separated from the diodes, wherein the shield cover has a flat portion having a plurality of passageways passing therethrough and a plurality of positioning blocks formed by adjacent passageways, the shield cover covers an upper side of the second escaping portion; and
    a cable connecting with the cable connecting box.

12. The junction box as claimed in claim 11, wherein the shield cover is mounted to the insulative block along a back-to-front direction.

13. The junction box as claimed in claim 11, wherein the separating wall has a retaining slot depressed forwardly from a rear thereof, the shield cover has an extending portion extending downwardly from a rear edge thereof and a retaining tail extending forwardly from the extending portion, the retaining tail is received in the retaining slot.

14. The junction box as claimed in claim 11, wherein the separating wall has a plurality positioning walls extending outwardly thereof and a receiving space formed by adjacent positioning walls, the shield cover has an attaching wall extending vertically and downwardly and two retaining convexes extending outwardly from two sides of the attaching wall, the retaining convex is located below the positioning wall and resists the positioning wall backwardly.

15. A junction box for use with a photovoltaic module, comprising:
    a cable connecting box defining an insulative block essentially extending in a horizontal manner with a plurality of contacting foils and corresponding diodes connected therewith wherein the contacting foils are insert-molded in the insulative box;
    a plurality of escaping portions located on one side of the insulative block;
    a plurality of upside-down triangular-shaped clips mounted into the corresponding escaping portions, respectively, in a vertical direction with regard to said horizontal manner, and a plurality of upstanding V-shaped elastic plate each forcibly inserted, along said vertical direction, into the corresponding clip with two upper edge sections extending above said clip;
    wherein
    one arm of said V-shaped elastic plate is substantially spaced from a corresponding first side of the clip while the other arm of said V-shaped elastic plate substantially intimately abuts against another corresponding second side of the clip for efficiently sandwiching a contacting leg of the photovoltaic module therebetween.

16. The junction box as claimed in claim 15, wherein said insulative box further defines a plurality of fences to separate the corresponding escaping portions from the corresponding diodes.

17. The junction box as claimed in claim 16, further including a shielding cover specifically covers the escaping portion wherein said insulative box and said shielding cover are configured to allow said shielding cover to be assembled thereto only along a front-to-back direction.

18. The junction box as claimed in claim 15, wherein each of said clips defines an opening in a corresponding third side thereof for allowing the two arms of the corresponding elastic plate to extend upwardly thereabove.

* * * * *